US006940505B1

(12) United States Patent
Savine et al.

(10) Patent No.: US 6,940,505 B1
(45) Date of Patent: Sep. 6, 2005

(54) DYNAMIC TESSELLATION OF A BASE MESH

(75) Inventors: Dmitri Savine, Pierrefonds (CA); Philippe Jean Beaudoin, Verdun (CA); Juan Miguel Guardado Cardenas, Montreal (CA); Jean-Jacques Ostiguy, Montreal (CA)

(73) Assignee: Matrox Electronic Systems Ltd., Dorval (CA)

( * ) Notice: Subject to any disclaimer, the term of this patent is extended or adjusted under 35 U.S.C. 154(b) by 252 days.

(21) Appl. No.: 10/147,805

(22) Filed: May 20, 2002

(51) Int. Cl.[7] .............................................. G06T 15/00
(52) U.S. Cl. ...................... 345/423; 345/440; 345/419
(58) Field of Search ............................... 345/419, 423, 345/427, 619, 625, 440, 420

(56) References Cited

U.S. PATENT DOCUMENTS

| | | | | |
|---|---|---|---|---|
| 5,905,507 A | * | 5/1999 | Rossignac et al. | 345/440 |
| 6,100,894 A | * | 8/2000 | Goel | 345/423 |
| 6,137,492 A | * | 10/2000 | Hoppe | 345/420 |
| 6,262,739 B1 | * | 7/2001 | Migdal et al. | 345/423 |
| 6,313,837 B1 | * | 11/2001 | Assa et al. | 345/420 |
| 6,396,490 B1 | * | 5/2002 | Gorman | 345/419 |
| 6,603,473 B1 | * | 8/2003 | Litke et al. | 345/420 |

OTHER PUBLICATIONS

Pulli et al., Fast Rendering of Subdivision Surfaces, pp. 61-70, 282, Proceedings of 7th Eurographics Workshop on Renderin Jun. 1996.*

* cited by examiner

Primary Examiner—Phu K. Nguyen
(74) Attorney, Agent, or Firm—Ogilvy Renault LLP

(57) ABSTRACT

A primitive of a base mesh having at least three base vertices is dynamically tessellated to enable smooth changes in detail of an image rendered on a screen. A respective floating point vertex tessellation value (Fv) is assigned to each base vertex of the base mesh, based on a desired level of detail in the rendered image. For each edge of the primitive: a respective floating point edge tessellation rate (Fe) of the edge is calculated using the respective vertex tessellation values (Fv) of the base vertices terminating the edge. A position of at least one child vertex of the primitive is then calculated using the respective calculated edge tessellation rate (Fe). By this means, child vertices of the primitive can be generated coincident with a parent vertex, and smoothly migrate in response to changing vertex tessellation values of the base vertices of the primitive.

61 Claims, 8 Drawing Sheets

DYNAMIC TESSELLATION OF A BASE MESH

CROSS-REFERENCE TO RELATED APPLICATIONS

This is the first application filed for the present invention.

MICROFICHE APPENDIX

Not Applicable.

TECHNICAL FIELD

The present invention relates to the rendering of graphical images on a screen, and in particular to dynamic tessellation of a base mesh enabling smooth changes in the level of detail of an image rendered on a screen.

BACKGROUND OF THE INVENTION

As is well known in the art, one of the techniques for rendering an image of an object on a screen (such as, for example, a computer monitor) involves defining a piecewise approximation of surface contours of the object using a "mesh" composed of a number of (nominally planar) polygons. Typically, all of the polygons within the mesh will be geometrically similar (rectangular or triangular, for example) but their size and shape will vary. Because the vertices of each polygon can be explicitly defined, the mesh can be readily mapped to appropriate pixel coordinates of the screen. A surface texture (including, inter alia, color and shading information) can then be applied to each polygon of the mesh to fully render the image.

As is also well known in the art, the level of detail in the rendered image is directly related to the size of the polygons within the mesh. Thus, for example, a large number of small polygons are used where a high level of surface detail is required, whereas a smaller number of large polygons can be used where less detail is needed. However, the amount of processing resources required to render an image is directly related to the number of polygons within the mesh. As a result, rendering a highly detailed image (consisting of a large number of polygons) of an object requires more processor resources, and thus typically takes longer, than rendering an image of the same object with less detail. Current graphics processing systems are typically capable of rendering millions of polygons per second. However, since smooth animation requires that an image be refreshed at a rate of at least 30 frames per second, a compromise between animation performance and rendering detail must normally be found.

Frequently, objects (such as, for example, characters in a video game) are generated using a so-called "base mesh" composed of a minimum number of large polygons, and so provides a minimum level of rendering detail. The polygons forming the base mesh are normally referred to as "primitives". These primitives are normally selected to enable the position and orientation of the object within a scene to be rapidly (and unambiguously) defined, and thereby facilitate appropriate scaling and animation of the object. In cases where a higher level of detail is required, additional polygons can be defined within each primitive, as needed.

The process of defining polygons within a primitive is referred to as "tessellation", and the number of polygons defined within a primitive is given by the "tessellation rate". Formally, the tessellation rate is the number of segments into which an edge of the primitive is divided by the vertices of the polygons defined within the primitive. Thus, for example, a primitive has (by definition) a tessellation rate of 1. If one or more polygons are then defined within the primitive, such that one new vertex lies on each edge of the primitive (thereby dividing each edge into two segments), then the tessellation rate will be 2. Similarly, If further polygons are then defined within the primitive, such that two vertices lie on each edge of the primitive (thereby dividing each edge into three segments), then the tessellation rate will be 3. As may be appreciated, since the tessellation rate (or value) is based on the number of segments into which an edge of the primitive is divided, the tessellation rate can be defined on a "per-edge" basis. In principle, this means that different edges of a primitive may have the same, or different, tessellation values.

Traditionally, base meshes are tessellated uniformly, meaning that all of the edges of each primitive have the same tessellation value. By extension, since adjacent primitives within the mesh share a common edge, all edges inside of the base mesh will necessarily have the same tessellation value. This implies that the same level of detail will be obtained throughout an image being rendered. As may be appreciated, uniform tessellation tends to yield a highly inefficient utilization of processor resources.

For example, portions of an object lying closer to the "camera position" (that is, the point from which a scene is observed) should be rendered with a high level of detail, while portions of the same object lying farther from the camera position can satisfactorily be rendered with less detail. When the entire object is rendered with uniform tessellation, the tessellation rate must be selected to provide the high-detail needed for portions close to the camera position. This implies that significant processing resources will be utilized defining and rendering unnecessary polygons in those portions of the object lying farther away from the camera position.

Another problem with uniform tessellation is that primitives facing away from the camera (which are inherently invisible) will be tessellated at the same rate as the visible primitives. This incurs a further waste of processing resources. A similar problem exists for primitives that are oriented at an angle near the "line of sight" from the camera position. These primitives typically denote the silhouette of the object, so higher tessellation rates would be beneficial. On the other hand, primitives fully facing the camera can be rendered with lower tessellation, because the required level of detail can frequently be provided using less computationally intensive methods.

Improved efficiency of utilization of processor resources can be obtained by the use of non-uniform tessellation in each primitive. Traditionally, this is accomplished by assigning a different tessellation rate to each edge of a primitive.

However, non-uniform tessellation suffers the problem that "cracks" can form along a shared edge between adjacent primitives with differing tessellation rates. In particular, a crack can occur at a "T-junction", which is formed when a vertex lying on a shared edge between a pair of primitives is connected to a polygon defined in only one of the involved primitives. This commonly occurs under two scenarios. A first scenario is a case in which edge tessellation rates are assigned with reference to each primitive. In the case of a shared edge, it is therefore possible to have a situation in which the edge tessellation rate relative to one primitive is different from that assigned relative to the other primitive sharing the same edge. A second scenario is a situation in which the edge tessellation rate is assigned without reference to any primitives (and thus will be the same of both primitives) but the respective vertices for polygons defined within each primitive are calculated in the local coordinate system of each primitive. In either scenario, rounding errors and misalignment between the local coordinate systems of the involved primitives can result in differences between the coordinates of vertices (calculated relative to each primitive) that should overlay one another, which causes a gap (or crack) to open between the two primitives. In a displayed image, such a crack can be made visible when an object "A" should obstruct the viewer's view of an object "B". A crack in object A can result in object B being at least partially visible through object A, which is clearly undesirable.

One known method of dealing with cracks is to use a post-processing method to identify and fill cracks before rendering the image on the screen. However, this solution consumes substantial processing resources, and thus at least partially negates the benefits of adopting a non-uniform tessellation regime.

In an animated scene, an object may move between the background and foreground of the scene, as well as across the field of view. As may be appreciated, as an object moves toward the camera position, the level of detail should progressively increase. Conversely, as the object moves away from the camera position, the level of detail should progressively decrease. Similarly, the level of detail should be higher for objects lying in the central portion of the field of view, and progressively diminish toward the edge of the frame. Preferably, these changes in the level of detail should be smooth, which requires that topological and geometric continuity must be preserved as the tessellation rate changes. If different schemes (i.e., the number and/or arrangement of polygons within a primitive) are implemented for different levels of tessellation, then continuity must be preserved during transitions between schemes. Topological and geometric discontinuities can be seen in a rendered image in the form of surface features that appear or disappear instantly, rather than gradually emerging (and enlarging) or fading out (and growing smaller). The sudden appearance and disappearance of features is referred to as "popping", and is clearly undesirable. However, such popping is commonly encountered in conventional systems, because changes in the tessellation rate unavoidably involve changing the tessellation scheme, as at least some large polygons are replaced by two or more smaller polygons.

Accordingly, a method of tessellating a primitive which permits efficient utilization of processing resources, prevents cracking, and ensures topological and geometric continuity (and thereby prevents popping) remains highly desirable.

SUMMARY OF THE INVENTION

Accordingly, an object of the present invention is to provide a method of tessellating a primitive which permits efficient utilization of processing resources, prevents cracking, and ensures topological and geometric continuity.

Accordingly, an aspect of the present invention provides a method of tessellating a primitive of a base mesh having at least three base vertices, the primitive being defined by edges extending between respective pairs of base vertices. A respective floating point vertex tessellation value (Fv) is assigned to each base vertex of the base mesh. For each edge of the primitive: a respective floating point edge tessellation rate (Fe) of the edge is calculated using the respective vertex tessellation values (Fv) of the base vertices terminating the edge. A position of at least one child vertex of the primitive is then calculated using the respective calculated edge tessellation rate (Fe). By this means, each child vertex of the primitive smoothly migrates in response to changing vertex tessellation values of the base vertices of the primitive.

Another aspect of the present invention provides a method of tessellating a primitive of a base mesh having at least three base vertices, the primitive being defined by edges extending between respective pairs of base vertices. A respective edge tessellation rate (Fe) of each edge of the primitive is calculated. An inner polygon is defined within the primitive. The inner polygon has a corner vertex which is connected to a corresponding base vertex of the primitive via a respective corner edge, and which lies on a line projected between the corresponding base vertex and a centroid of the primitive. A respective inner tessellation rate (Fin) of each edge of the inner polygon is calculated based on the edge tessellation rates calculated for the edges of the primitive.

A still further aspect of the present invention provides a method of tessellating a primitive of a base mesh having at least three base vertices, the primitive being defined by edges extending between respective pairs of base vertices. A performance parameter is calculated, and used for selecting a tessellation rate. The primitive is then tessellated using the selected tessellation rate.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
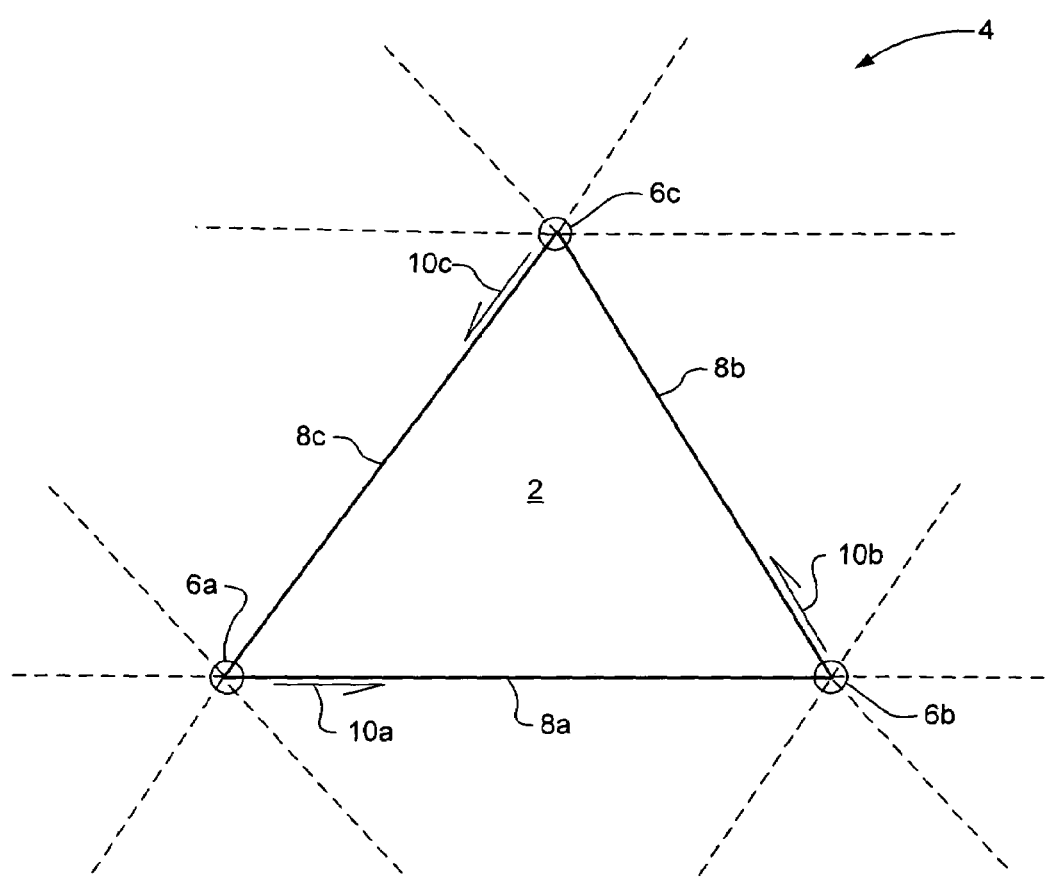
FIG. 1 illustrates an exemplary base mesh primitive within a base mesh.

The present invention provides a method of tessellating a base mesh consisting of a plurality of base vertices interconnected by base mesh edges defining polygonal primitives of the base mesh. FIG. 1 schematically illustrates a base mesh primitive 2 within an exemplary base mesh 4. As shown in FIG. 1, the primitive 2 is defined by a respective set of base mesh vertices 6 that are interconnected by base mesh edges 8.

In general, the base mesh 4 may be composed of primitives 2 of any arbitrary shape. However, for computational efficiency and versatility, triangular primitives are preferred. In this case, the base mesh 4 can be provided as an arbitrary mesh of triangular primitives 2, defined by a base vertex array and connectivity information in the form of a primitive list. In order to prevent cracking, T-junctions within the base mesh 4 should be avoided. In addition, improved image rendering may be obtained by defining the base vertex array and primitive list such that the lengths of the base mesh edges 8 are of the same order of magnitude (i.e., the triangular primitives 2 should preferably be close to equilateral).

As is well known in the art, the attributes of each base mesh vertex form part of the mesh definition. During tessellation, attributes of each child vertex defined within the primitive 2 are derived from those of the base mesh vertices 6. This can readily be accomplished by interpolation between the respective attributes of the base vertices 6. Either linear or non-linear interpolation may be used for this purpose, as desired. In order to facilitate interpolation of child vertex attributes, it is preferable to define the location of each child vertex with reference to a local coordinate system of the base mesh primitive. This can readily be accomplished by selecting one of the base mesh vertices 6 as an "origin", and then defining the axes of the local coordinate system based on the pair of edges 8 that share the selected vertex 6. In the case of a triangular base mesh primitive 2, this approach means that the location of each child vertex with a base mesh primitive 6 can be completely defined by an equation (or equivalent) of the form:

$$v_0(a,b) = V_0 + (V_1 - V_0)a + (V_2 - V_0)b. \quad \text{(Equ. 1)}$$

Where:
- $V_0$ is the absolute coordinate (within the base mesh 4) of the "origin" base vertex 6;
- $V_1$ and $V_2$ are the absolute coordinates (within the base mesh 4) of each of the two adjacent base vertices 6, respectively;
- $v_0$ is the absolute coordinate of a child vertex (within the base mesh 4) referenced to the selected "origin" base vertex 6; and
- a and b are coefficients that define the relative distance between the child vertex and the "origin" base vertex 6, along each axis of the local coordinate system in each coordinate direction (that is, edge direction).

This method of calculating vertex attributes can also be used as a compression method for the transfer of vertex information between a host system and a vertex engine which may, for example, be instantiated in a graphics processing unit (GPU) linked to the host system via a suitable data bus. For example, the base mesh definition (that is, the base vertex coordinates and attributes), and the desired rendering detail (e.g. as represented by the vertex tessellation rates, as described below) can be used by the host system to determine the number and location of child vertices within each base mesh primitive in the manner described in greater detail below. The location of each such child vertex can be completely represented by the (a,b) coefficient values from Equ. 1 above. However, the (a,b) coefficients will normally involve significantly less data than the absolute 3-dimentional coordinates of each child vertex, and thus represents a compressed form of the vertex location information. It is therefore possible to store the location of each child vertex by storing its respective (a,b) coefficients. The host processor can then define connectivity between the vertices of the mesh 2, by means of indices to the compressed vertex information (a,b) coefficient values.

The host system can then pass the compressed vertex information and connectivity indices to the vertex engine. The vertex engine can then resolve the absolute coordinates of each vertex using the base mesh definition, and (a,b) coefficient values in conjunction with Equ. 1 above, and then use the connectivity indices to assemble the vertices into the final mesh for rendering.

In accordance with the invention, tessellation of each base mesh primitive 2 (and thus the rendering detail) is controlled by assigning a respective vertex tessellation value to each base vertex 6. The vertex tessellation values are then used to calculate respective edge tessellation rates for each edge 8 of the base mesh. The respective edge tessellation rates of each edge 8 can then be used to calculate both the number and position of child vertices along that edge. As a result, as the desired rendering detail increases, a child vertex can be generated and migrate smoothly away from a respective "parent" vertex, so that popping is prevented. In addition, because the positions of all vertices lying on an edge 8 are calculated solely with reference to the respective edge tessellation rate, corresponding vertices of two primitives 2 sharing a common edge will precisely overlay one another. This prevents the opening of cracks during the tessellation of the base mesh 4.

It will be seen that the edge tessellation rate of each edge 8 of the base mesh is derived from individual vertex tessellation values assigned to its respective base vertices 6. As such, the edge tessellation rate is independent of any one base mesh primitive 2, and thus each primitive 2 sharing an edge 8 will "see" the same edge tessellation rate. This has the advantage that rounding errors in the calculation of edge vertices of each involved primitive 2 will be less likely to produce cracks. Furthermore, assigning a respective vertex tessellation value to each base vertex ensures that each base vertex sees only one tessellation value, and thus avoids any possible confusion resulting from a base vertex seeing a different tessellation value for each edge sharing that vertex.

In general, the respective vertex tessellation value (Fv) assigned to each base vertex 6 can be any arbitrary floating point (i.e., real number) value. However, in order to improve the efficiency of utilization of processor resources (and/or overall system performance), various sampling rate criteria can advantageously be used for selecting the vertex tessellation value assigned to each base vertex 6. Exemplary sampling rate criteria include (but are not limited to) a distance between the base vertex and an assumed camera position; an orientation of the base vertex relative to a sight-line projected between the camera position and the base vertex; and the availability of processor resources for rendering the tessellated base mesh.

Preferably, the vertex tessellation value (Fv) is driven by the distance between the base vertex and an assumed camera position, using a mathematical relationship of the form:

$$F_v = \frac{N * Vn + \phi}{Z_r} \quad \text{(Equ. 2)}$$

where:
- $F_v$ is the (floating-point) tessellation rate of the base vertex 6. If desired, $F_v$ can be clamped to a specific range that is predetermined in accordance with the application (e.g. between Tmax and Tmin);
- Vn is a predetermined vertex attribute assigned by the designer. Vn acts as a per-vertex controller for the tessellation rate, and may, for example be used to reduce the amount of tessellation in areas known not to need them, such as flat surfaces and extremely small details such as fingers.
- $Z_r$ is the distance from the base vertex 6 to the assumed camera position (z-coordinate of the base vertex in camera space);

N is a predetermined tessellation parameter defining the number of segments into which an edge of the primitive will be divided when $Z_r=1$; and Φ is an offset based on other criteria, as described below.

The tessellation parameter (N) is a floating point (i.e., real number) value that governs the general amount of tessellation required for the image being displayed. As indicated by Equ. 2, a higher value of N yields a correspondingly higher amount of tessellation, and thus detail, in the rendered image. In many implementations, satisfactory results can be obtained with a constant value of N, selected by the designer during system development. For example, the value of N may be selected based on a desired maximum value of the tessellation rate $F_v$, to thereby limit the processing load imposed on the host system, while at the same time providing a reasonable level of rendering detail.

If desired, the value of the tessellation rate $F_v$ can be determined entirely from the distance between the base vertex 6 and the assumed camera position, in which case the value of Φ will be set to Φ=0. However, it may be desired to control tessellation based on one or more sampling rate criteria in addition to distance. This can readily be achieved by varying the value of the offset (Φ). For example, increased system efficiency can be obtained by controlling the value of Φ, for each base vertex 6, based on an angular orientation of the involved base vertex 6 relative to a sight-line from the assumed camera position. In this case, the value of the offset (Φ) may, for example, be found using an equation of the form:

$$\Phi = N_o(1 - |V \cdot S|) \qquad \text{(Equ. 3)}$$

Where:

$N_o$ is an arbitrary scaling factor, that may be selected to define a maximum value of Φ;

V is a vector orientation of the base vertex; and

S is a vector orientation of the sight-line.

As is well known in the art, the value of V is a conventional attribute of each base vertex (known as a vertex normal), and will typically be defined as part of the base mesh definition.

It may also be desirable to vary the amount of tessellation based on the location of the rendered image on a screen. For example, it may be desirable to provide a higher level of detail (and thus tessellation) for objects located near the center of the screen, and gradually reduce the tessellation level toward the periphery of the screen. Alternatively, various known techniques may be used to detect a region of the screen where a viewer is focusing their attention (e.g., by detecting motion of the viewer's eyes). This information may be used to dynamically increase the tessellation level within the detected "focus region", and reduce tessellation away from that area. In either case, the desired functionality can readily be accomplished by suitably varying the value of $N_o$ (between predetermined maximum and minimum limits, if desired) based on the location of the base vertex in screen coordinates.

As is well known in the art, satisfactory animation performance requires that the time required to render an image must necessarily be less than the screen refresh time. In order to provide reasonably fluid motion, the screen must be refreshed at a rate of at least 30 frames per second, which means that each frame must be fully rendered in a maximum of 0.033 seconds. In some cases, available processor resources may be insufficient to render a frame (with a desired level of detail) within this time period. In conventional systems, the level of rendering detail is fixed by the software application, so that inadequate processor resources becomes visible by way of a reduced screen refresh rate (and a resulting loss of animation performance). In some cases, however, it may be preferable to sacrifice image detail in order to retain animation performance. This can be accomplished by varying the value of $N_o$ based on a selected measure of the system performance. For example, a timer may be implemented to detect the amount of time required to render the image. This detected time can then be compared to a threshold value, and the comparison result used to increase or decrease the value of $N_o$ as required to keep the image rendering time within acceptable limits.

Once the vertex tessellation values (Fv) have been assigned, a respective edge tessellation rate (Fe) can be calculated for each edge 8 of the base mesh 4. Various "interpolation" functions can be used to calculate the edge tessellation rate (Fe) for an edge 8, using the respective vertex tessellation values (Fv) of the base vertices 6 bounding that edge 8. One such interpolation function is a simple average of the vertex tessellation values (Fv) in question. Various alternative interpolation functions may also be used (such as, for example, calculating the value at the midpoint of a parabolic or elliptical curve mapped between the involved end-points 6). As may be appreciated, the edge tessellation rate (Fe) will normally be a floating point (i.e., real number) value.

Once the edge tessellation rates have been calculated, each primitive 2 of the base mesh 4 can be tessellated by defining child vertices and polygons within each primitive 2. In general, two factors govern the tessellation of each base mesh primitive: a predefined edge orientation, and the selected tessellation scheme.

As described above, adjacent base mesh primitives (i.e., those sharing a common base mesh edge 8) having different levels of rendering detail, may introduce cracks. The use of an edge-specific tessellation value (Fe), in combination with a defined edge orientation effectively prevents crack formation. In particular, the edge tessellation rate (Fe) forces adjacent primitives 2 to have the same edge tessellation rate on the shared edge 8, thereby preventing T-junctions. Furthermore, the use of a defined edge orientation (which is used by both primitives) ensures that child vertices generated for both primitives 2 are calculated in the same manner, and with reference to a common origin. This, in turn, ensures that rounding errors will not produce fractional coordinate differences for corresponding child vertices generated in the two primitives 2. Edge orientation can be defined in various ways, as desired. For example, each edge can be associated with a corresponding edge coordinate system having an origin at one end of the edge (i.e., at a selected one of the base vertices) and an x-axis co-extensive with the edge 8. In the illustrated embodiment, the edge orientation of each edge 8a–c of the primitive 2 is shown by the arrows 10 in FIG. 1.

In accordance with the present invention, each edge 8 of the base mesh 4 has a respective edge tessellation rate ($Fe_i$), which is calculated from the respective vertex tessellation values $Fv_i$ of the base mesh vertices 6 defining the edge 8. As such, the edge tessellation rate ($Fe_i$) is independent of the primitives 2 sharing that edge. However, the overall tessellation of each base mesh primitive 2 is governed by the edge tessellation rates of all of the base mesh edges 8 defining the involved primitive 2. In general, tessellation of each primitive 2 follows a process of calculating the edge tessellation rate $Fe_i$ for each edge 8 of the primitive 2, and then calculating a position of at least one child vertex within the primitive, based on the calculated edge tessellation rates. As described below with reference to FIGS. 2–12, repeated execution of this process enables the base primitive 2 to be tessellated in such a way that each base edge 8 can have a unique edge tessellation rate ($Fe_i$). A uniformly tessellated inner polygon can be used to ensure continuity across the primitive 2, even when different edges 8 have respective different edge tessellation rates.

In the embodiment of FIGS. 1–12, various different tessellation schemes are utilized, depending on the calculated edge tessellation rates, to facilitate smooth changes in rendering detail as tessellation rates change. These tessellation schemes are topologically similar, so that sudden changes in resolution (i.e., popping) during changes in the tessellation scheme are avoided.

In general, tessellation of each edge 8 of a primitive 2 can be completely defined by two parameters, namely: the edge tessellation rate ($Fe_i$); and the edge segmentation value ($Ie_i$). As described above, the edge tessellation rate ($Fe_i$) is a floating point value calculated from the vertex tessellation values Fv assigned to the base vertices 6 defining the edge 8. In contrast, the edge segmentation value ($Ie_i$) is an integer value corresponding to the number of segments into which the edge 8 is divided. For each edge (i), the edge segmentation value ($Ie_i$) is dependent on the edge tessellation rate ($Fe_i$) as follows:

$$Ie = \text{Max}(1, \text{Ceiling}(Fe))(Fe<2) \quad \text{(Equ. 4)}$$

and $$Ie = 2^m + 3 \ (Fe \geq 2) \quad \text{(Equ. 5)}$$

where (m) is given by:

$$m = 0 (Fe<4) \quad \text{(Equ. 6)}$$

$$m = \text{Ceiling}(\text{Log}_2(Fe-3))(Fe \geq 4) \quad \text{(Equ. 7)}$$

In equation 4, Max(x, y) should be understood to refer to the maximum function of x and y, that is, the larger of the two values. In equations 4 and 7 above, Ceiling(x) should be understood to refer to the ceiling function of (x), that is, the smallest integer value that is equal to or greater than (x).

Thus it may be appreciated that $Fe_i$ is a smoothly varying value that changes continuously in response to changes in the relevant vertex tessellation values Fv. In contrast, the edge segmentation value $Ie_i$ is an integer value that changes in discrete steps in response to changes in $Fe_i$. In the present invention, the edge tessellation rate $Fe_i$ is used to control the position (and thus migration) of vertices along the edge, while the edge segmentation value Ie is used to control the number of vertices. As a result, while Fe<Ie, vertices move with increasing values of Fe, until such time as Fe=Ie. At this point, the vertices are evenly distributed along the edge. Any further incremental increase in Fe will cause a step-wise increase in Ie, as (at least some) edge vertices are tessellated to generate child vertices. The vertices of the edge then continue migration along the edge until Fe once again equals Ie. As may be appreciated, the reverse process also occurs, as the value of Fe decreases. In this case, edge vertices migrate toward each other as Fe decreases until Fe=Ie, at which point at least one pair of edge vertices overlay one another. A further incremental decrease in Fe causes a step-wise reduction in Ie, as each pair of overlaying vertices are collapsed into a single vertex, which then continues to migrate along the edge with further reductions in the value of Fe.

Tessellation of a base mesh primitive in accordance with a preferred embodiment of the present invention will now be described in greater detail with reference to FIGS. 2–12, which illustrate successive steps in the tessellation of a triangular base mesh primitive 2 as the vertex tessellation values Fv (and thus edge tessellation rates progressively increase.

In general, tessellation of the base mesh primitive 2 is conducted in accordance with a set of predetermined ranges of edge tessellation values. Each range of tessellation values may be conveniently delimited by respective lower and upper limit values, and is characterized by a respective tessellation scheme.

Figure 2:
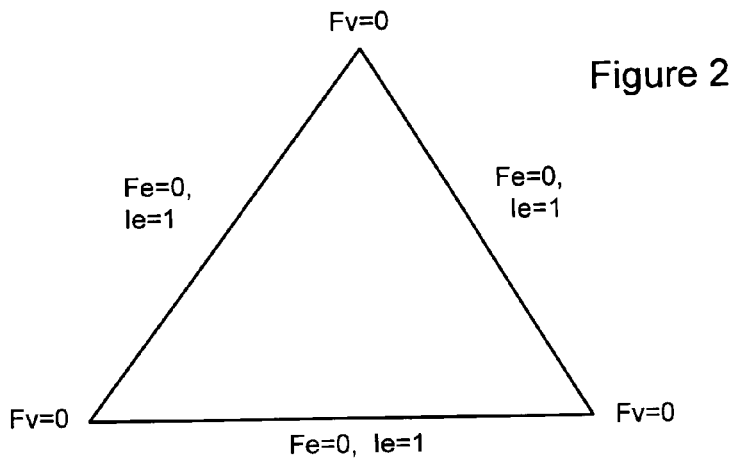
FIGS. 2–12 illustrate successive steps in the tessellation of the base mesh primitive of FIG. 1, in accordance with an embodiment of the present invention.
Figure 3:
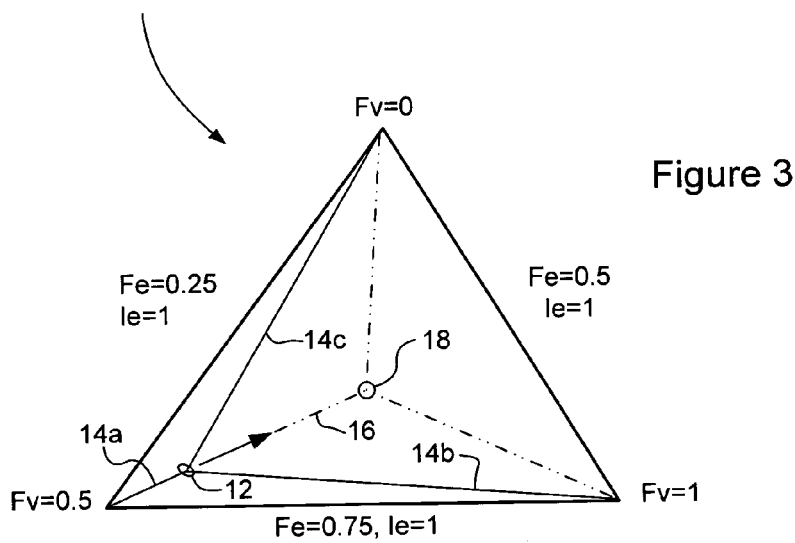
Figure 4:
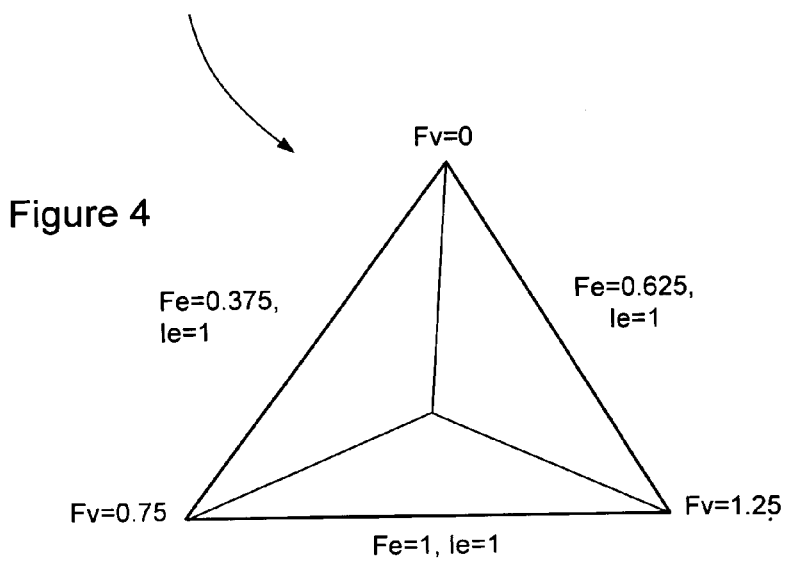

FIGS. 2–4 illustrate tessellation of the base mesh primitive 2, within a first range of edge tessellation values. FIG. 2 shows the primitive in an un-tessellated state, which corresponds to a minimum level of rendering detail. In this state, the vertex tessellation value ($Fv_i$) assigned to each base vertex 6 is zero for all three involved base vertices 6a–c. Consequently, the respective edge tessellation rate $Fe_i$ calculated for each edge 8 is also zero. The respective edge segmentation value $Ie_i$ calculated for each edge 8 is $Ie_i=1$, indicating that each edge 8 of the base primitive 2 is "divided" into a single edge segment.

As the vertex tessellation values $Fv_i$ of each base vertex 6 increase (e.g., due to reducing distance between the primitive and the camera position, rotation of the base mesh primitive, or other factors), the corresponding edge tessellation rates $Fe_i$ and edge segmentation values $Ie_i$ are recalculated as described above. As may be seen in FIGS. 2–4, for values of $Fe_i$ between 0 and 1, the corresponding edge segmentation values $Ie_i$ remain constant at $Ie_i=1$. In general, little benefit is obtained by tessellating the base primitive for any value of $Fe_i$ close to zero, as such a low level of tessellation is likely not to be visible on a monitor screen. Thus it will frequently be desirable to delay the start of tessellation until $Fe_i$ is significantly greater than zero. Accordingly, the highest edge tessellation rate ($Fe_{MAX}$) among the edge tessellation rates $Fe_i$ of the primitive is identified, and compared against a respective first lower limit threshold ($F_{L1}$) of the first tessellation value range, which is used to define the point at which tessellation of the base primitive 2 actually begins. The first lower limit threshold ($F_{1L}$) can be any suitable value, such as, for example, $F_{1L}=0.7$.

When $Fe_{MAX}=F_{1L}(=0.7$, in the present example), a first tessellation scheme is selected, and the base primitive 2 begins to tessellate. In accordance with this first tessellation scheme, a single child vertex 12 is generated at one of the base vertices 6 of the primitive 2. In general, the child vertex 12 may be generated at any one of the base vertices 6, which may be predefined (e.g., as part of the base mesh specification), or dynamically determined (e.g., by selecting the origin of the edge 8 having the highest edge tessellation rate $Fe_{MAX}$). In either case, the child vertex 12 is connected to each of the base vertices 6 of the primitive 2 via respective child edges 14. As may be seen in FIGS. 3 and 4, as the value of $Fe_{MAX}$ increases above the first lower limit threshold ($F_{L1}$), the child vertex 12 migrates along a line 16 projected between the selected "parent" base vertex 6 and the centroid 18 of the base primitive 2. The relative length of the child edge 14a extending between the parent and child vertices 6a and 12 can conveniently be calculated using an equation of the form:

$$Lc = \frac{(F_{1U} - F_{1L})}{(Fe_{MAX} - F_{1L})} \quad (Fe_{MAX} \le F_{1U}) \qquad \text{(Equ. 8)}$$

Where Lc is the relative length of the child edge 14a; $F_{1L}$ is the lower limit threshold of the first predetermined range; and $F_{1U}$ is the upper limit threshold of the first predetermined range. It will be noted that when $Fe_{MAX}=F_{1U}$, Lc=1 and the child vertex 12 will therefore be located at the centroid 18 of the base primitive 2. At this point, the child vertex 12 may then be referred to as the "centre vertex", and the child edges 14 referred to as "corner edges". In order to ensure topological continuity, and avoid popping (or other artifacts), the value of $F_{1U}$ will normally be set to a value of $F_{1U}=Ie(=1$, in FIGS. 2–4).

Throughout the first range of tessellation values, the position of the child vertex 12 is governed by the value of $Fe_{MAX}$. Those edges 8 of the base primitive that have lower edge tessellation rates may have any value of $Fe_i<Fe_{MAX}$ without consequence. No edge tessellation, in that no vertices are created on any base mesh edge 8, occurs whenever $Fe_{MAX} \le F_{1U}$.

When $Fe_{MAX}$ increases above $F_{1U}$, a second tessellation scheme is selected, and the base primitive 2 continues to tessellate. In accordance with the second tessellation scheme, a new child vertex 20 is generated on each base edge 8 for which the respective edge tessellation rate $Fe_i>F_{1U}$. In order to maintain topological continuity, the child vertex 20 is generated at the "parent" base vertex 6 (i.e., at the origin) of its respective edge 8, and is connected to the center vertex 12 by a respective child edge 22. As may be seen in FIGS. 5 and 6, the edge segmentation value $Ie_i$, of each base edge 8 for which the respective edge tessellation rate $Fe_i>F_{1U}$, is calculated using equations 4–6 above, and has a value of $Ie_i=2$.

Figure 5:
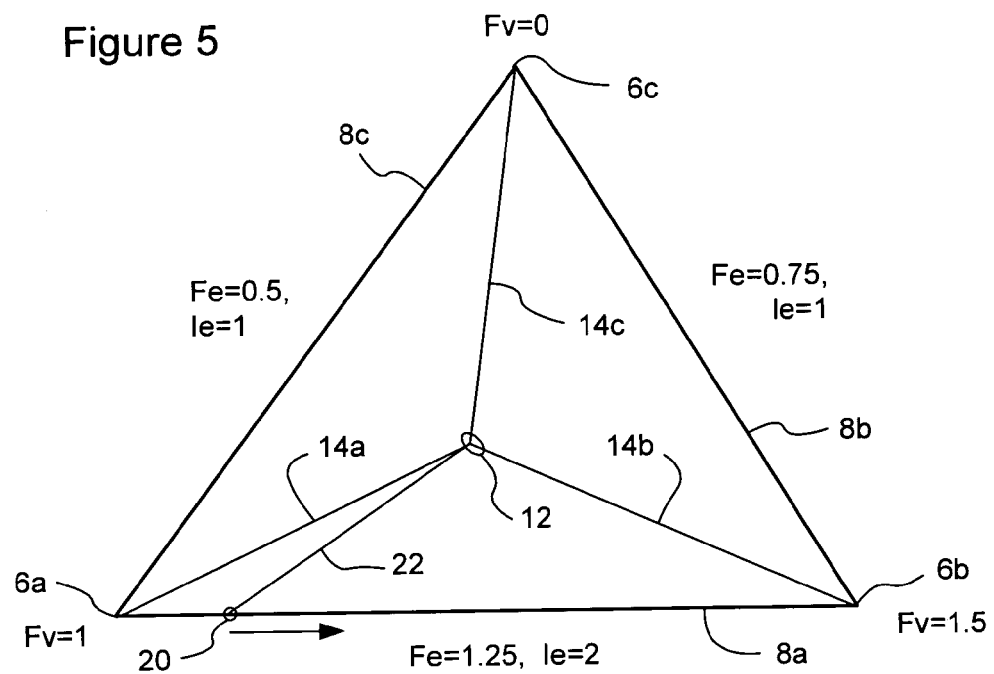
Figure 6:
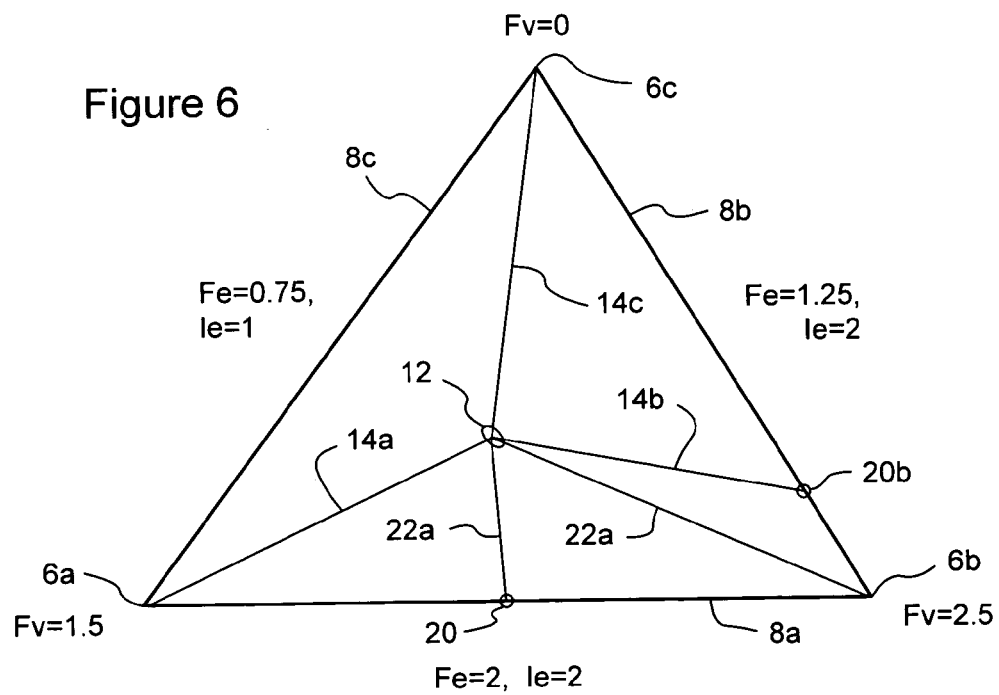

As the value of the edge tessellation rate $Fe_i$ rises above $F_{1U}$, the respective child vertex 20 migrates away from the parent base vertex 6 (base edge origin), as shown in FIGS. 5 and 6. The relative distance between the parent and child vertices 6a and 20 can conveniently be determined by assigning an ordinal value, corresponding to the fractional part of the edge tessellation rate $Fe_i$, to the edge segment extending between the parent vertex 6a and the child vertex 20. The relative length of the edge segment is then determined from the ratio between the assigned ordinal value and the edge tessellation rate $Fe_i$. For example, in FIG. 5, the edge tessellation rate Fe of base edge 8a of the primitive 2 is Fe=1.25. Accordingly, an ordinal value of 0.25 is assigned to the edge segment extending between the parent vertex 6a and the child vertex 20. The relative length of this segment is then found as 0.25/1.25=0.2, so that the absolute length of the edge segment (and thus the location of the child vertex 20 along edge 8a of the primitive 2) can be found by multiplying the length of edge 8a by 0.2.

Thus it will be seen that, as the edge tessellation rate $Fe_i$ increases between $Fe_i=F_{1U}=1$ and $Fe_i=Ie_i=2$, the child vertex 20 migrates progressively toward the midpoint of the base edge 8. These two limit values (ie $Fe_i=1$ and $Fe_i=2$) can conveniently be referred to as the lower and upper limit values ($F_{2L}$ and $F_{2U}$, respectively) of the second range of tessellation values. That is, $F_{2L}=F_{1U}=1$ and $F_{2U}=2$.

When $Fe_{MAX}$ increases above $F_{2U}$, a third tessellation scheme is selected, and the base primitive continues to tessellate. In accordance with the third tessellation scheme, the previous child vertex 20 (on each base edge 8 for which the respective edge tessellation rate $Fe_i \ge F_{2U}$) becomes a "parent" vertex for a pair of new child vertices 24. In addition, the center vertex 12 is tessellated to generate an inner polygon 26 having the same shape as the base primitive 2. As may best be seen in FIGS. 7 and 8, each corner vertex 28 of the inner polygon 26 is connected to a respective base vertex 6 of the base primitive 2 by a corresponding corner edge 14. Additionally, each child vertex 24 is connected to a respective corner vertex 28 of the inner polygon 26 by a corresponding child edge 30. In order to maintain topological continuity between the second and third tessellation schemes, when $Fe_i=F_{2U}$; both child vertices 24 on the base edge 8 are coincident with the parent vertex 20 (that is, they both lie at the midpoint of the base edge 8), and all of the corner vertices 28 of the center polygon 26 are coincident (that is, they all lie at the centroid 18 of the base primitive 2). As may be seen in FIGS. 7 and 8, the edge segmentation value $Ie_i$, of each base edge 8 for which the respective edge tessellation rate $Fe_i>F_{1U}$, is calculated using equations 4–6 above, and has a value of $Ie_i=4$.

Figure 7:
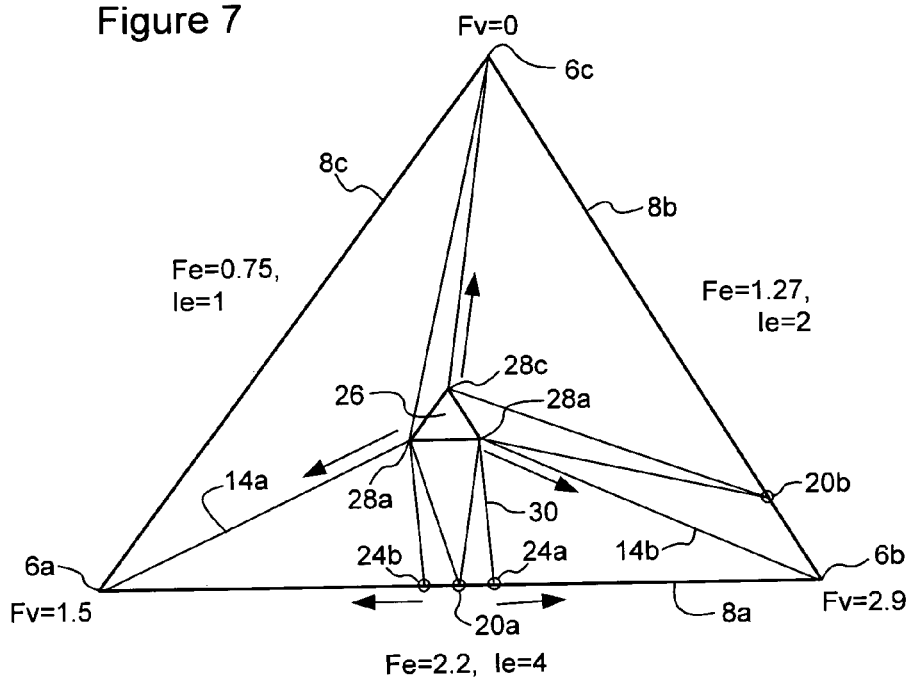
Figure 8:
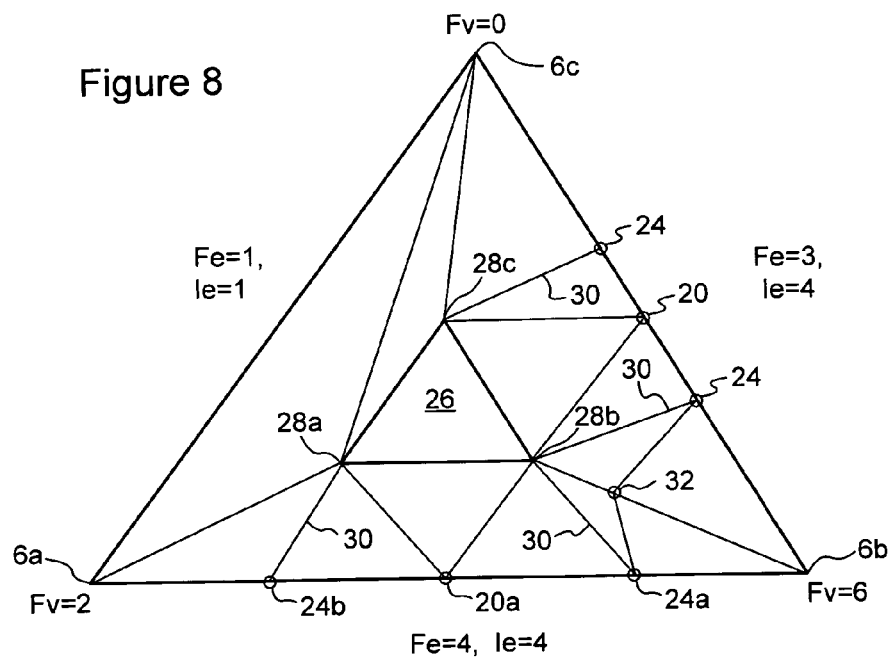
Figure 9:
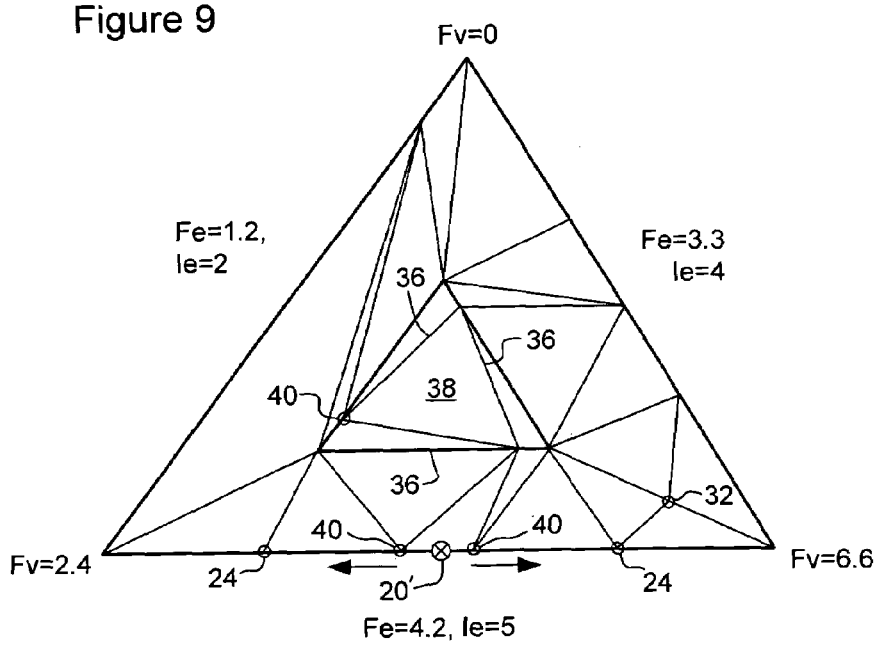

As the edge tessellation rate $Fe_i$ rises above $F_{2U}$, the child vertices 24 on the base edge 8 migrate away from the parent vertex 20 (the base edge midpoint), as shown in FIGS. 7 and 8. The relative distance between the parent and child vertices 20 and 24 can conveniently be determined by assigning an ordinal value corresponding to half of the fractional part of the edge tessellation rate $Fe_i$ to each edge segment extending between the parent vertex 20 and the child vertices 24. The relative length of each edge segment is then determined from the ratio between the assigned ordinal value and the edge tessellation rate $Fe_i$. For example, in FIG. 7, the edge tessellation rate Fe of base edge 8a of the primitive 2 is Fe=2.2. Accordingly, an ordinal value of 0.2/2=0.1 is assigned to each edge segment extending between the parent vertex 20 and the child vertices 24. The relative length of these segments is then found as 0.1/2.2=0.05, so that the absolute length of each edge segment (and thus the location of each child vertex 24 along edge 8a of the primitive 2) can be found by multiplying the length of the edge 8a of the primitive 2 by 0.05.

Thus it will be seen that, as the edge tessellation rate $Fe_i$ increases between $Fe_i=F_{2U}=2$ and $Fe_i=Ie_i=4$, each child vertex 24 migrates progressively away from the midpoint of the base edge 8, until the child and parent vertices 24 and 20 are evenly spaced along the base edge 8. These two limit values (ie $Fe_i=2$ and $Fe_i=4$) can conveniently be referred to as the lower and upper limit values ($F_{3L}$ and $F_{3U}$, respectively) of a the third range of tessellation values. That is, $F_{3L}=F_{2U}=2$ and $F_{3U}=4$.

At the same time as the child vertices 24 are migrating away from the parent vertex 20 on the base edge 8, the inner polygon 26 is expanding, due to migration of the inner polygon corner vertices 28 toward their respective base vertices 6 of the base primitive 2. In general, the size of the inner polygon 26 can be found by calculating the relative length of each corner edge 14 as follows:

$$Lc = \frac{1}{Fe_{MAX} - (F_{th1} - 1)} \qquad \text{(Equ. 9)}$$

Where $F_{th1}$ is a first threshold value that corresponds with $F_{3L}(=2$ in the illustrated embodiment). The absolute length of each corner edge 14 can then be determined by multiplying Lc, for each corner edge 14, by the absolute length of the line 16 projecting between the respective base vertex 6 and the centroid 18 of the base primitive 2 (see FIG. 3). As can be seen from Equation 8 above, the inner polygon 26 progressively grows from the centroid 18 of the base primitive 2 as the value of $Fe_{MAX}$ increases beyond $F_{th1}=F_{3L}$.

As may be appreciated, the third tessellation scheme effectively divides the base primitive 2 into three sectors as follows: the inner polygon 26; a respective corner sector proximal each base vertex 6 of the base primitive 2, and an edge centre-sector on each base edge 8 of the base primitive 2. As will be described below, for values of $Fe_{MAX}>F_{th1}$, these sectors are tessellated differently in order to ensure topological integrity and avoid artifacts.

Each corner sector is delimited by a base vertex 6, its corresponding corner vertex 28 of the inner polygon 26; and the nearest child vertex 24 on each of the two base edges 8 sharing the involved base vertex 6. As may be appreciated, the size of the corner sector will naturally vary with $Fe_{MAX}$, as the length Lc of the corner edge 14 (which bisects the corner sector) changes in accordance with equation 9 above. However, for all values of $Fe_{MAX}>F_{th1}$, a common tessellation scheme is implemented within each corner sector. In particular, a corner area center (CAC) vertex 32 is generated on the corner edge 14, and migrates along the edge 14 as will be described below. The CAC vertex 32 is connected via corresponding corner area edges to each of the vertices delimiting the corner sector, namely: the base vertex 6, its corresponding corner vertex 28 of the inner polygon 26; and the nearest child vertex 24 on each of the two base edges 8 sharing the involved base vertex 6. Thus in the illustrated embodiment, the CAC vertex 32 operates to tessellate the corner sector into four triangular polygons.

In order to maintain topological continuity, the CAC vertex 32 is generated coincident with the corner vertex 28 of the inner polygon 26, and then migrates along the corner edge 14 toward the corresponding base vertex 6 with increasing values of $Fe_i$. The relative position of the CAC vertex 32 within the corner sector is calculated based on the lowest edge tessellation rate ($Fe_{MIN}$) among the $Fe_i$ values of the involved base edges 6 as follows:

For $Fe_{MIN} \leq 2$; the CAC vertex 32 is located coincident with the inner polygon corner vertex 28, so that the CAC vertex 32 remains invisible;

For $Fe_{MIN} \geq 4$; the CAC vertex 32 is located at the midpoint between the inner polygon corner vertex 28 and the base vertex 6; and For $2<Fe_{MIN}<4$; the location of the CAC vertex 32 is determined by interpolation (linear or non-linear interpolation may be used, as desired) between the inner polygon corner vertex 28 and the midpoint between the inner polygon corner vertex 28 and the base vertex 6.

The edge centre-sector on each base edge 8 of the base primitive 4 is delimited by the two child vertices 24 nearest each base vertex 6 defining the base edge 8, and the corresponding inner polygon 26 corner vertices 28. For all values of $Fe_{MAX}>F_{th1}$, the edge centre-sector encompasses at least one center-sector vertex, each of which is connected to a respective pair of vertices of the inner polygon 26. For example, referring back to FIGS. 7 and 8, for values of $F_{3L}<Fe_i<F_{3U}$, the edge centre-sector encompasses a single center-sector vertex, namely the parent vertex 20 located at the midpoint of the base edge 8a. As shown in FIGS. 7 and 8, this center-sector vertex 20 is connected to the nearest corner vertices 28a,b of the inner polygon 26.

As mentioned previously, for values of $Fe_{MIN} \geq 2$, the tessellation scheme implemented within each corner sector does not change. Furthermore, within each corner sector, the relative location of the respective CAC vertex does not change for values of $Fe_{MIN} \geq 4$ (although its absolute location will vary with changes in the size of the corner sector as a whole). Accordingly, as the value of $Fe_{MAX}$ increases beyond $F_{3U}$ (=4 in the illustrated embodiment), further tessellation of the base polygon is confined to the inner polygon 26 and the centre-sector of each base edge 8. The respective tessellation schemes implemented in each of these sectors will now be described with reference to FIGS. 9–12.

In general, the inner polygon 26 is uniformly tessellated in order to enable transitions between differing edge segmentation values $Ie_i$ on each of the base edges 8. For the purposes of computation, the inner polygon 26 can be attributed a floating-point tessellation rate ($F_{in}$) and an edge segmentation rate ($I_{in}$). These values are governed by the value of $Fe_{MAX}$ as follows:

$$F_{in}=1 (Fe_{MAX} \leq 4) \qquad \text{(Equ. 10)}$$

$$F_{in}=Fe_{MAX}-3 (Fe_{MAX}>4) \qquad \text{(Equ. 11)}$$

and $$I_{in}=2^m (Fe_{MAX} \geq 2) \qquad \text{(Equ. 12)}$$

where m is calculated in accordance with Equations 6 and 7 above.

When $F_{in}$ equals $I_{in}$, each edge of the inner polygon is divided into equal sized segments. An incremental increase in Fin above this level causes each vertex of the inner polygon to tessellate to generate child vertices 34, with a corresponding increase in the value of $I_{in}$. As may be seen in FIGS. 9–12, tessellation of the inner polygon 26 comprises an iterative process of generating new child vertices 34 corresponding to each existing vertex of the inner polygon 26. These child vertices 34 are connected to each other by corresponding child edges 36 defining child polygons 38 that follow the same shape as the inner polygon 26. As $F_{in}$ increases, the child vertices 34 migrate away from their respective parent vertices such that each child polygon 38 may be seen to rotate within its "parent" polygon. The relative distance between the child vertex and its respective parent vertex may be found using the equation:

$$L_{in} = \frac{x}{(1+x)} \qquad \text{(Equ. 13)}$$

where Lin is the relative distance between the child vertex and its respective parent vertex, and x is the fractional part of $F_{in}$. The absolute distance can then be calculated by multiplying $L_{in}$ by the length of the edge segment between the two parent vertices. Migration of the child vertices continues until each child vertex is located at the midpoint of its immediately associated edge segment, at which point $F_{in}$ again equals $I_{in}$. This process can be repeated (in principle, indefinitely) to achieve any required level of tessellation of the inner polygon.

Thus in the illustrated embodiment, for example, when FeMAX=4, Fin=Iin=1, an incremental increase in the value of FeMAX results in tessellation of the inner polygon 26, as child vertices 34 are generated at each corner vertex 28 of the inner polygon 26. At this point, Fin=1, and Iin=2. As Fin increases (following equation 10 above) each child vertex 34 migrates away from its respective parent vertex in a clockwise direction. As may bee seen in FIG. 9, when FeMAX=4.2, Fin=1.2 (following Equation 10), and Iin=2.

The relative distance between each child vertex and its respective parent vertex is Lin=0.2/1.2=0.17, so that the absolute distance will be the length of the associated edge segment (in FIG. 8, the length of the involved edge of the inner polygon) multiplied by Lin=0.17.

Figure 10:
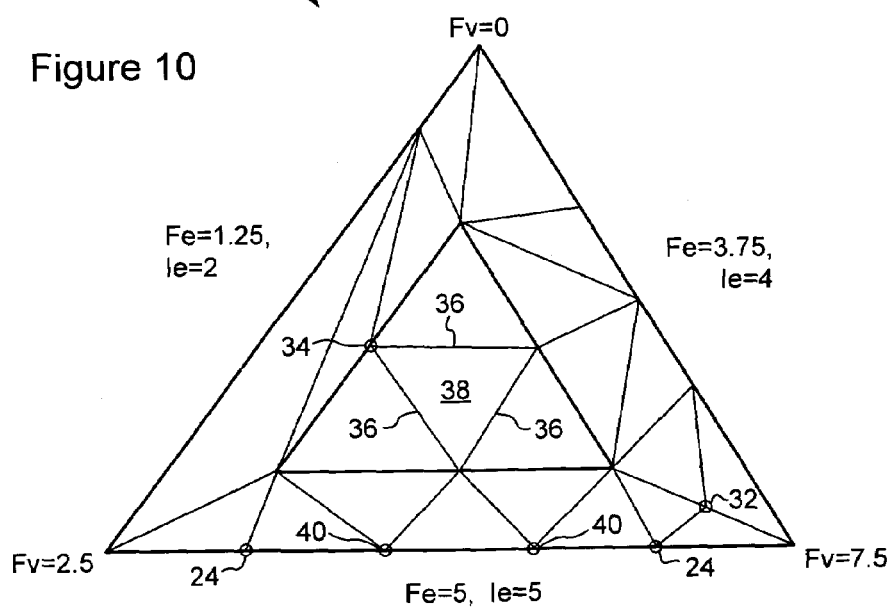

When $F_{in}=I_{in}=2$, each child vertex 34 will lie at the midpoint of its associated edge, as shown in FIG. 10. Further increases in Fin will lead to a further tessellation of the inner polygon 26, as new child vertices 34 are generated and migrated as described above, and illustrated in FIGS. 11 and 12.

Referring back to FIGS. 9 and 10, as $Fe_{MAX}$ increases beyond $Fe_{MAX}=4$, each centre-section vertex is tessellated to generate a respective pair of child vertices, which migrate in opposite directions away from the parent vertex location, until all of the vertices are evenly distributed along the base edge. This process repeats for continued increases in $Fe_{MAX}$, as centre-section vertices are tessellated to generate respective pairs of child vertices.

Thus, for example, in FIG. 8, a single centre-section vertex 20 is located at the midpoint of base edge 8a of the base primitive 2. As may be seen in FIG. 9, as FeMAX increases above $Fe_{MAX}=4$, the centre-section vertex 20 is tessellated to generate a respective pair of child vertices 40. These child vertices 40 migrate in opposite directions away from the parent vertex location 20' until Fe=Ie=5, at which point all of the vertices 24, 40 are evenly distributed along the base edge 8 (see FIG. 9).

Figure 11:
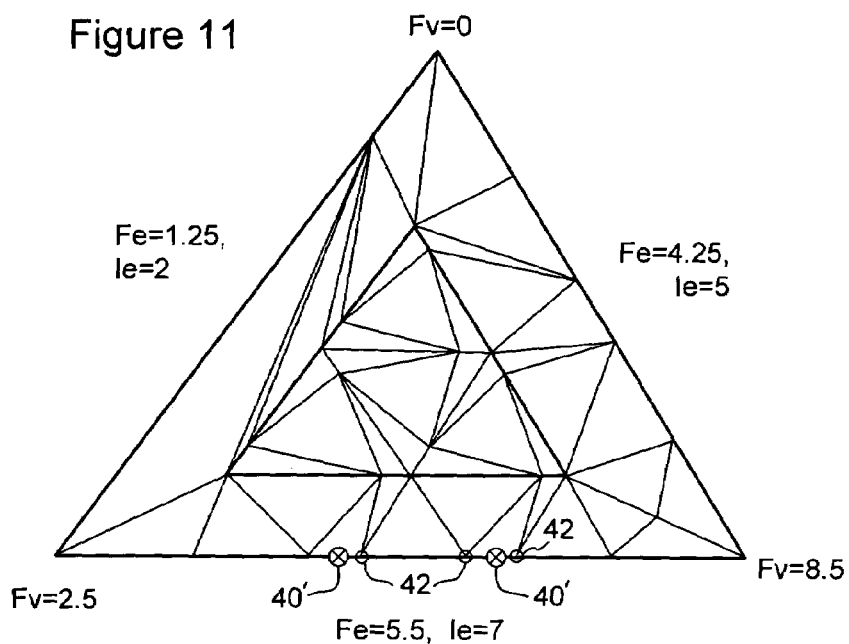
Figure 12:
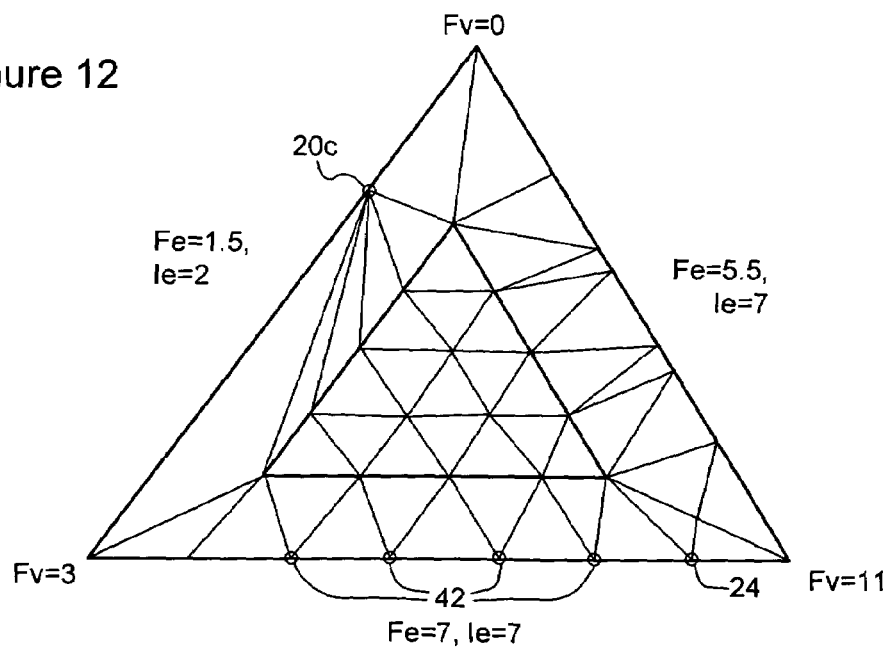

As shown in FIGS. 11 and 12, as $Fe_{MAX}$ increases above $Fe_{MAX}=5$, the two centre-section vertices 40 are each tessellated to generate respective pairs of child vertices 42. These child vertices 42 migrate in opposite directions away from their respective parent vertex locations 40' (accompanied by tessellation of the inner polygon 26) until Fe=Ie=7, at which point all of the vertices 24, 42 are again evenly distributed along the base edge 8a (see FIG. 12). As may be appreciated, this process can be repeated (in principle, indefinitely) to achieve any desired level of tessellation of each edge 8 of the base primitive 2. In practice, an upper bound of effective tessellation has been found to correspond to an edge tessellation rate $Fe_i$ of about 19, although larger values can be attained, if desired.

The foregoing description has focused on tessellation of the base edge 8a having the highest edge tessellation rate $Fe_i=Fe_{MAX}$. As will be appreciated, each of the other base edges 8b,c of the primitive 2 will generally have a lower $Fe_i$ value, possibly markedly so. For example, in FIG. 12, the edge 8a of the base primitive 2 has a value of $Fe_i=Fe_{MAX}=7$, while the adjacent (left-hand side) edge 8c has an edge tessellation rate of $Fe_i=1.5$. As described above (and illustrated in FIG. 12), such a low edge tessellation rate results in a single child vertex 20 on that edge 8c located at a relative distance of 0.5/1.5=0.33 from the origin 6c of base edge 8c. In order to avoid artifacts, this child vertex 20 will be connected to each inner polygon vertex 28,34 lying on the corresponding edge of the inner polygon 26. Thus the number of edges 22 between the child vertex 20 and the inner polygon 26 will increase as the inner polygon 26 tessellates. As the edge tessellation rate $Fe_i$ of edge 8c increases, the child vertex 20 will migrate to the edge midpoint, and tessellate to generate new child vertices 24, 40 and 42 as described above with reference to FIGS. 5–12.

An alternative method of achieving the same result is to force the tessellation of each edge 8, so that each edge 8 has the same number of vertices as the edge having the highest edge tessellation rate $Fe_i=Fe_{MAX}$. In this case, each of these edge vertices will be connected to respective inner polygon 26 vertices 28, 34 in the same manner, so that the same pattern of edge connections is established for each edge 8 of the base primitive 2. However, for those edges having an edge tessellation rate $Fe_i<Fe_{MAX}$, at least some of the edge vertices will remain coincident, and migrate together until the edge tessellation rate $Fe_i$ increases beyond successive values of $Ie_i$—resulting in a progressive "unfolding" of the edge vertices, following the pattern described above with respect to FIGS. 5–12.

The concept of texture wrapping has been incorporated into the overall system of the present invention. As is well known in the art, the rendering of an object involves mapping a predefined texture to the tessellated base mesh 4. Typically, this is accomplished by calculating a respective texture coordinate $(u_x, v_x)$ of each vertex of the base mesh 4. The attributes of each pixel of the image can then be determined by interpolation between the texture coordinates of each vertex, in order to find the closest texel of the texture. The attributes of that texel can then be assigned to the respective pixel of the image.

Figure 13:
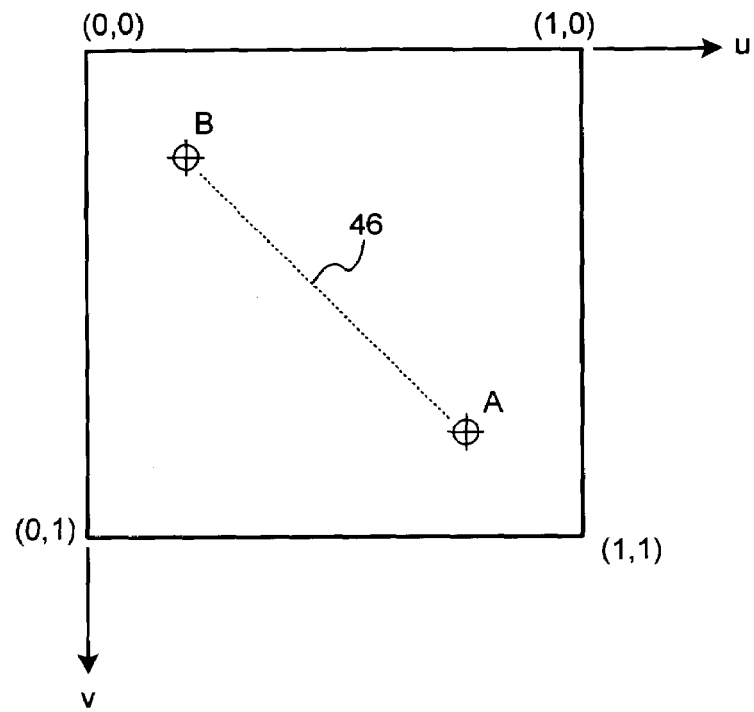
FIG. 13 illustrates a 2-dimensional texture.
Figure 14:
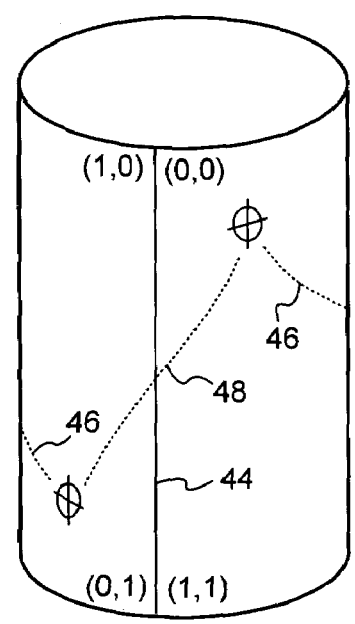
FIG. 14 shows the texture of FIG. 13 wrapped around a cylinder.

Typically, a texture is defined as a 2-dimensional surface (e.g. defined between (0,0) and (1,1)), as shown in FIG. 13. This 2-D texture can be "wrapped" around the tessellated base mesh of a 3-dimentional object in order to provide an appropriate 3-D rendering. By way of illustration, FIG. 14 shows the texture of FIG. 13 wrapped around a cylinder. As may be appreciated, this wrapping of a 2-D texture will inherently result in opposite borders of the mesh being co-incident. For example, in FIG. 14, the (0,0)–(0,1) border of the texture is coincident with the (1,0)–(1,1) border. This coincidence of opposite texture borders is referred to as a wrapping boundary 44 (see FIG. 14), and can have a dramatic impact on the rendering of an object.

For example, consider a pair of vertices "A" and "B", each of which has respective texture coordinates of (0.8, 0.8) and (0.1, 0.1), as shown in FIG. 13. In order to determine the attributes of each pixel between vertices "A" and "B", the nearest texel within the texture will be determined by interpolation between (0.8, 0.8) and (0.1, 0.1). For the 2-D texture shown in FIG. 13, this interpolation will be calculated along the shortest path 46 between the two vertices (in texture coordinates) which extends through the center region of the 2-D texture. However, if the vertices "A" and "B" are part of a 3-D mesh around which the texture has been wrapped, this interpolation may yield an incorrect result. As may be seen in FIG. 14, the correct texel will in fact lie along the path 48 between the two vertices in mesh coordinates, crossing the wrapping boundary 44.

Accordingly, the present invention provides a method of interpolating the texture coordinate of the correct texel, when a wrapping boundary 44 passes through a polygon of the tessellated base mesh 4. Consider, for example, a 2-D texture that is wrapped along the u direction (to render a cylindrical object (as shown in FIG. 14). In this case, interpolated v-coordinates will not be affected by the presence of the wrapping boundary. Consequently, the v-coordinate is not carried though the following discussion, in order to simplify the description. The u-coordinate of the correct texel can be found using the following 4 steps:

1) detect if the wrapping boundary 44 crosses the base primitive. This occurs if $$|u_1 - u_0| > \tfrac{1}{2} \qquad \text{(Equ. 14a)}$$

or $$|u_2 - u_0| > \tfrac{1}{2} \qquad \text{(Equ. 14b)}$$

Where $u_0$, $u_1$ and $u_2$ are the u-coordinates of each of the three vertices of the (triangular) primitive, defined in the texture coordinate system.

2) If the wrapping boundary 44 crosses the base primitive, then, for each vertex having a u-coordinate $u_x > \frac{1}{2}$, calculate a respective relocated u-coordinate $u'_x$ as follows:

$$u'_x = u_x - 1 \qquad \text{(Equ. 14)}$$

3) Then calculate an interpolated u-coordinate value $u_i$ between the three vertex u-coordinates, using relocated and non-relocated values, as appropriate.

4) If the interpolated u-coordinate value $u_i < 0$, then add 1 to the interpolated u-coordinate value $u_i$.

As may be appreciated, the above processing steps can equally be applied to the v-coordinates of each vertex (in the texture coordinate system). Thus the system of the present invention can properly accommodate wrapping of a texture about a tessellated mesh in the u- and/or v-coordinate directions.

Figure 15:
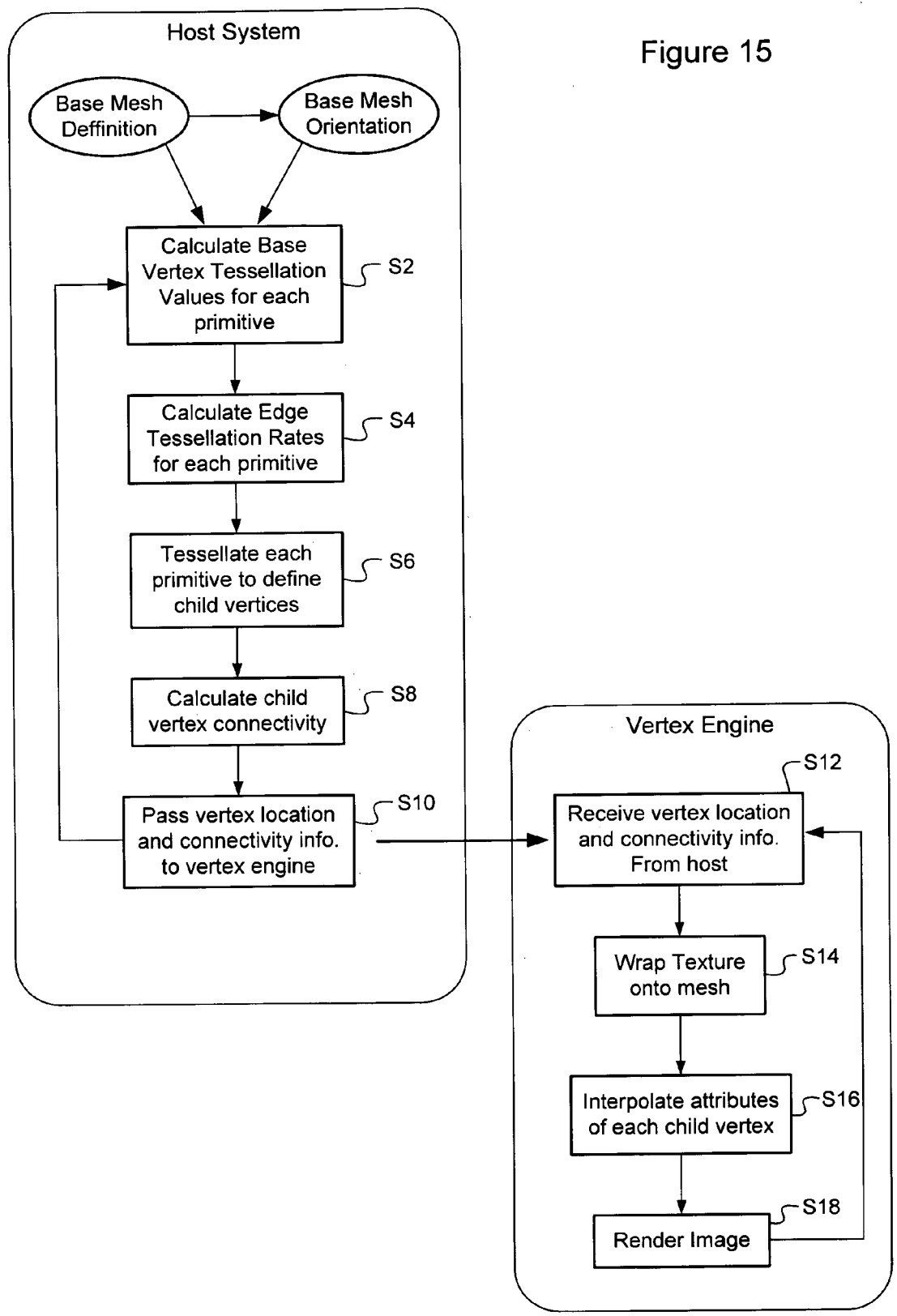
FIG. 15 is a flow chart illustrating principle steps in a dynamic tessellation process in accordance with the present invention.

FIG. 15 is a flow chart illustrating principle steps in a dynamic tessellation process in accordance with the present invention. The process of FIG. 15 is implemented on a platform having a host system (e.g. the main CPU) and a vertex engine, which may be implemented as part of a graphics processing unit (GPU) coupled to the host system via a suitable data bus (not shown). Those of ordinary skill in the art will recognise, however, that the present invention is in no way limited to such a platform. In most cases, dynamic tessellation will be utilised to facilitate the rendering of images generated by a software application, such as, for example, a computer game. In such cases, the software application will normally include a base mesh definition for each object (or object class) that may be instantiated for rendering. Thus, when an object is instantiated (i.e. during run-time of the software application), the base mesh orientation (e.g. local coordinate systems of each primitive) is calculated. Following instantiation of the object, its position within an image frame can be calculated, and updated at regular intervals (which may, or may not correspond with the refresh-rate of the image frame).

Once the position of the object (within the image frame) has been determined, the object's base mesh can be tessellated, and the object rendered for display. This process of tessellation and rendering will normally be repeated for each frame, so that the image is completely updated at the refresh-rate of the image frame. Thus at step S2, respective vertex tessellation rates (Fv) for each base mesh vertex 6 are calculated, following equations 2 and 3 above. Respective edge tessellation rates (Fe) of each base mesh edge 8 can then be calculated (at step S4). The edge tessellation rates (Fe) of each base mesh edge 8 are then used to tessellate (at step S6) each base mesh primitive (as described above with reference to Equ. 1 and FIGS. 2–12) in order to find the number and location of each child vertex. The vertex connectivity can then be calculated (at step S8), and the vertex location and connectivity information passed to the vertex engine for rendering (at step S10).

Upon receipt of the vertex location and connectivity information from the host system (Step S12), the vertex engine maps the appropriate texture for the object (which will normally be part of the object definition, instantiated by the host system) to the object mesh (Step S14), in order to interpolate attribute values for each child vertex within each primitive (Step S16). Once the attribute values of each vertex has been interpolated, the object can be rendered, and rasterized in a known manner for display (Step S18).

The embodiment(s) of the invention described above is(are) intended to be exemplary only. The scope of the invention is therefore intended to be limited solely by the scope of the appended claims.

We claim:

1. A method of tessellating a primitive of a base mesh having at least three base vertices, the primitive being defined by edges extending between respective pairs of base vertices, the method comprising steps of:

assigning a respective floating point vertex tessellation value (Fv) to each base vertex of the base mesh; and for each edge of the primitive:

calculating a respective floating point edge tessellation rate (Fe) of the edge using the respective vertex tessellation values (Fv) of the base vertices terminating the edge; and calculating a position of at least one child vertex of the primitive using the respective calculated edge tessellation rate (Fe), whereby each child vertex of the primitive smoothly migrates in response to changing vertex tessellation values of the base vertices of the primitive.

2. A method as claimed in claim 1, comprising a preliminary step of assigning a respective co-ordinate system to each edge of the base mesh, the co-ordinate system having an origin coextensive with a selected base vertex of the edge, and an axis coextensive with the edge.

3. A method as claimed in claim 1, wherein the step of assigning a respective vertex tessellation value to each base vertex of the base mesh comprises, for each base vertex, steps of:

calculating a respective sampling rate parameter; and calculating the respective vertex tessellation value using the calculated sampling rate parameter.

4. A method as claimed in claim 3, wherein the step of calculating the sampling rate parameter comprises a step of calculating any one or more of:

a distance between the base vertex and a camera position;

an orientation of the base vertex relative to a sight-line extending between the camera position and the base vertex; and a performance parameter.

5. A method as claimed in claim 4, wherein the step of calculating a performance parameter comprises steps of:

calculating a frame rendering time required to render a video image for display; and comparing the calculated frame rendering time to a predetermined required frame refresh rate.

6. A method as claimed in claim 4, wherein the step of calculating a performance parameter comprises steps of:

counting a number of vertices within a frame to be rendered; and comparing the number of vertices to a predetermined maximum number of vertices.

7. A method as claimed in claim 1, wherein the step of calculating the edge tessellation rate comprises a step of calculating an average of the respective vertex tessellation values of the base vertices of the edge.

8. A method as claimed in claim 1, further comprising a step of calculating at least one attribute of each child vertex.

9. A method as claimed in claim 8, wherein the step of calculating at least one attribute of each child vertex comprises a step of interpolating between respective attribute values of each base vertex of the primitive.

10. A method as claimed in claim 1, further comprising steps of:
identifying a highest edge tessellation rate ($Fe_{MAX}$) among the respective edge tessellation rates calculated for each edge of the primitive; and
selecting a tessellation scheme from among a set or predetermined tessellation schemes, based on the identified highest edge tessellation rate ($Fe_{MAX}$).

11. A method as claimed in claim 10, wherein, when the identified highest edge tessellation rate ($Fe_{MAX}$) is within a first predetermined range of values, the selected tessellation scheme comprises a single child vertex disposed on a line extending between a base vertex of the primitive and a centroid of the primitive, the child vertex being connected to each base vertex of the primitive via respective child edges.

12. A method as claimed in claim 11, wherein the step of calculating the position of at least one child vertex comprises a step of calculating a relative length of the child edge extending between the child vertex and the nearest base vertex.

13. A method as claimed in claim 12, wherein the step of calculating the relative length of the child edge comprises a step of calculating a ratio of the form:

$$Lc = \frac{(F_{1U} - F_{1L})}{(Fe_{MAX} - F_{1L})}$$

Where Lc is the length of the relative length of the child edge; $F_{1L}$ is the lower limit of the first predetermined range; and $F_{1U}$ is the upper limit of the first predetermined range.

14. A method as claimed in claim 10, wherein, when the identified highest edge tessellation rate ($Fe_{MAX}$) is within a second predetermined range of values, the selected tessellation scheme comprises a respective child vertex disposed on each base mesh edge having a respective edge tessellation rate (Fe) greater than a lower limit value ($F_{2L}$) of the second predetermined range.

15. A method as claimed in claim 14, wherein the step of calculating the position of at least one child vertex comprises, for each base mesh edge having a respective edge tessellation rate (Fe) greater than the lower limit value ($F_{2L}$) of the second predetermined range, a step of calculating the length of an edge segment extending between a predetermined origin of the edge and the respective child vertex.

16. A method as claimed in claim 15, wherein the predetermined origin of the edge corresponds with a selected one of the base vertices of the edge.

17. A method as claimed in claim 15, wherein the step of calculating the length of the edge segment comprises steps of:
assigning an ordinal value to the edge segment, the ordinal value corresponding to the fractional part of the calculated edge tessellation rate (Fe) of the edge; and
calculating a ratio between the assigned ordinal value and the calculated edge tessellation rate (Fe).

18. A method as claimed in claim 10, wherein, when the identified highest edge tessellation rate ($Fe_{MAX}$) is within a third predetermined range of values, the selected tessellation scheme comprises, for each base mesh edge having a respective edge tessellation rate (Fe) greater than a lower limit value ($F_{3L}$) of the third predetermined range, a parent vertex disposed at a centre of the edge, and a pair of child vertices disposed on opposite sides of the parent vertex.

19. A method as claimed in claim 18, wherein the step of calculating the position of at least one child vertex comprises a step of calculating a relative length of a respective edge segment between the parent vertex and each child vertex.

20. A method as claimed in claim 19, wherein the step of calculating the relative length of the respective edge segment between the parent vertex and each child vertex comprises, for each edge segment, steps of:
assigning an ordinal value to each edge segment, the ordinal value corresponding to half of the fractional part of the edge tessellation rate (Fe) of the edge; and
calculating a ratio between the assigned ordinal value and the edge tessellation rate (Fe) of the edge.

21. A method as claimed in claim 10, wherein, when the identified highest edge tessellation rate is greater than a first predetermined threshold ($F_{th1}$), the selected tessellation scheme comprises an inner polygon defined within the primitive, the inner polygon being disposed about the centroid of the primitive, and having corner vertices disposed on lines projected between each base vertex and the centroid of the primitive.

22. A method as claimed in claim 21, further comprising a step of calculating a relative length of respective corner edges extending between each corner vertex of the inner polygon and a corresponding base vertex of the primitive.

23. A method as claimed in claim 22, wherein the relative length of each corner edge (Lc) is calculated in accordance with the equation:

$$Lc = \frac{1}{Fe_{MAX} - (F_{thI} - 1)}$$

whereby the inner polygon progressively grows from the centroid of the primitive as the identified largest edge tessellation rate of the primitive increases.

24. A method as claimed in claim 21, further comprising a step of calculating a respective tessellation value of each edge of the inner polygon.

25. A method as claimed in claim 24, wherein the inner polygon is uniformly tessellated, and the step of calculating the respective tessellation value of each edge of the inner polygon comprises a step of calculating an inner polygon tessellation rate ($F_{in}$) using the identified highest edge tessellation rate ($Fe_{MAX}$) of the primitive.

26. A method as claimed in claim 25, wherein the inner polygon tessellation rate ($F_{in}$) is calculated in accordance with the equations:

$F_{in} = 1 (0 \leq Fe_{MAX} \leq 4)$; and $F_{in} = Fe_{MAX} - 3 (Fe_{MAX} > 4)$.

27. A method as claimed in claim 21, wherein, when the identified highest edge tessellation rate ($Fe_{MAX}$) is greater than a second predetermined threshold ($F_{th2}$), the selected tessellation scheme further comprises, for each base mesh edge having a respective edge tessellation rate (Fe) greater than the second predetermined threshold ($F_{th}$), a pair of centre section child vertices symmetrically disposed about a predetermined parent location, each centre section vertex being connected to at least two vertices of the inner polygon via respective edges.

28. A method as claimed in claim 27, wherein the step of calculating the position of at least one child vertex comprises a step of determining the predetermined parent location.

29. A method as claimed in claim 28, wherein the step of determining the predetermined parent location comprises steps of:
  calculating a tessellation floor value corresponding to the largest integer value that is less than or equal to the respective edge tessellation rate (Fe); and
  determining the parent location as corresponding to that of a centre- section vertex when the edge tessellation rate (Fe) is equal to the calculated tessellation floor value.

30. A method as claimed in claim 27, wherein the step of calculating the position of at least one child vertex comprises a step of calculating the relative length of an edge segment extending between the pair of centre- section child vertices.

31. A method as claimed in claim 30, wherein the step of calculating the length of the edge segment comprises steps of:
  assigning an ordinal value to the edge segment, the ordinal value corresponding to the fractional part of the edge tessellation rate (Fe) of the edge, divided by the number of pairs of edge section child vertices; and
  calculating a ratio between the assigned ordinal value and the calculated edge tessellation rate (Fe).

32. A method of tessellating a primitive of a base mesh having at least three base vertices, the primitive being defined by edges extending between respective pairs of base vertices, the method comprising steps of:
  calculating a respective edge tessellation rate (Fe) of each edge of the primitive;
  defining an inner polygon within the primitive, the inner polygon having a corner vertex connected to a corresponding base vertex of the primitive via a respective corner edge and lying on a line projected between the corresponding base vertex and a centroid of the primitive; and
  calculating a respective inner tessellation rate (Fin) of the inner polygon.

33. A method as claimed in claim 32, wherein the step of calculating a respective edge tessellation rate (Fe) of each edge of the primitive comprises steps of:
  assigning a respective vertex tessellation value to each base vertex of the base mesh; and
  calculating the respective edge tessellation rate (Fe) of each edge using the vertex tessellation values assigned to the respective base vertices of the edge.

34. A method as claimed in claim 33, wherein the step of assigning a respective vertex tessellation value to each base vertex of the base mesh comprises, for each base vertex, steps of:
  calculating a respective sampling rate parameter; and
  selecting the respective vertex tessellation value using the calculated sampling rate parameter.

35. A method as claimed in claim 34, wherein the step of calculating the sampling rate parameter comprises a step of calculating any one or more of:
  a distance between the base vertex and a camera position;
  an orientation of the base vertex relative to a sight-line extending between the camera position and the base vertex; and
  a performance parameter.

36. A method as claimed in claim 35, wherein the step of calculating an orientation of the base vertex comprises a step of calculating an average of respective orientations of each primitive sharing the base vertex.

37. A method as claimed in claim 35, wherein the step of calculating an orientation of the base vertex comprises a step of calculating an average of respective orientations of each edge of the base mesh sharing the base vertex.

38. A method as claimed in claim 35, wherein the step of calculating a performance parameter comprises steps of:
  calculating a frame rendering time required to render a video image for display; and
  comparing the calculated frame rendering time to a predetermined required frame refresh rate.

39. A method as claimed in claim 35, wherein the step of calculating a performance parameter comprises steps of:
  counting a number of vertices within a frame to be rendered; and
  comparing the number of vertices to a predetermined maximum number of vertices.

40. A method as claimed in claim 33, wherein the step of calculating the edge tessellation rate comprises a step of calculating an average of the respective vertex tessellation values of the base vertices of the edge.

41. A method as claimed in claim 33, further comprising a step of calculating at least one attribute of each child vertex.

42. A method as claimed in claim 41, wherein the step of calculating at least one attribute of each child vertex comprises a step of interpolating between respective attribute values of each base vertex of the primitive.

43. A method as claimed in claim 32, wherein the step of defining an inner polygon within the primitive comprises a step of calculating a relative length (Lc) of respective corner edges extending between each corner vertex of the inner polygon and a corresponding base vertex of the primitive.

44. A method as claimed in claim 43, wherein the relative length of ach corner edge (Lc) is calculated in accordance with the equation:

$$Lc = \frac{1}{Fe_{\text{MAX}} - (F_{th1} - 1)}$$

where:
  $Fe_{MAX}$ is the highest edge tessellation rate among the respective edge tessellation rates calculated for each edge of the primitive; and
  $F_{th1}$ is a first predetermined threshold value;
  Whereby the inner polygon progressively grows from the centroid of the primitive as the identified largest edge tessellation rate of the primitive increases above the first predetermined threshold value.

45. A method as claimed in claim 32, wherein the inner polygon is uniformly tessellated, and the step of calculating the respective tessellation value of each edge of the inner polygon comprises a step of calculating an inner polygon tessellation rate ($F_{in}$) using the identified highest edge tessellation rate ($Fe_{MAX}$) of the primitive.

46. A method as claimed in claim 45, wherein the inner polygon tessellation rate ($F_{in}$) is calculated in accordance with the equations:

$$F_{in}=1(0 \leq Fe_{MAX} \leq 4); \text{ and}$$

$$F_{in}=Fe_{MAX}-3(Fe_{MAX}>4)$$

Where $Fe_{MAX}$ is the highest edge tessellation rate among the respective edge tessellation rates calculated for each edge of the primitive.

47. A method as claimed in claim 32, further comprising steps of:
  identifying a highest edge tessellation rate ($Fe_{MAX}$) among the respective edge tessellation rates calculated for each edge of the primitive; and
  selecting an edge tessellation scheme from among a set of predetermined tessellation schemes, based on the identified highest edge tessellation rate ($Fe_{MAX}$).

48. A method as claimed in claim 47, wherein, when the identified highest edge tessellation rate ($Fe_{MAX}$) is within a predetermined range of values, the selected edge tessellation scheme comprises a respective child vertex disposed on each base mesh edge having a respective edge tessellation rate (Fe) greater than a lower limit value ($F_L$) of the predetermined range.

49. A method as claimed in claim 48, wherein the step of calculating the position of at least one child vertex comprises, for each base mesh edge having a respective edge tessellation rate (Fe) greater than the lower limit value ($F_L$), a step of calculating the length of an edge segment extending between a predetermined origin of the edge and the respective child vertex.

50. A method as claimed in claim 49, wherein the predetermined origin corresponds with a selected one of the base vertices of the edge.

51. A method as claimed in claim 49, wherein the step of calculating the length of the edge segment comprises steps of:
  assigning an ordinal value to the edge segment, the ordinal value corresponding to the fractional part of the calculated edge tessellation rate (Fe) of the edge; and
  calculating a ratio between the assigned ordinal value and the calculated edge tessellation rate (Fe).

52. A method as claimed in claim 47, wherein, when the identified highest edge tessellation rate ($Fe_{MAX}$) is within a second predetermined range of values, the selected tessellation scheme comprises, for each base mesh edge having a respective edge tessellation rate (Fe) greater than a lower limit value ($F_{2L}$) of the second predetermined range, a parent vertex disposed at a centre of the edge, and a pair of child vertices disposed on opposite sides of the parent vertex.

53. A method as claimed in claim 52, wherein the step of calculating the position of at least one child vertex comprises a step of calculating a relative length of a respective edge segment between the parent vertex and each child vertex.

54. A method as claimed in claim 53, wherein the step of calculating the relative length of the respective edge segment between the parent vertex and each child vertex comprises, for each edge segment, steps of:
  assigning an ordinal value to each edge segment, the ordinal value corresponding to half of the fractional part of the edge tessellation rate (Fe) of the edge; and
  calculating a ratio between the assigned ordinal value and the edge tessellation rate (Fe) of the edge.

55. A method as claimed in claim 47, wherein, when the identified highest edge tessellation rate ($Fe_{MAX}$) is greater than a second predetermined threshold ($F_{th2}$), the selected tessellation scheme further comprises, for each base mesh edge having a respective edge tessellation rate (Fe) greater than the second predetermined threshold ($F_{th}$), a pair of centre section child vertices symmetrically disposed about a predetermined parent location, each centre section vertex being connected to at least two vertices of the inner polygon via respective edges.

56. A method as claimed in claim 55, wherein the step of calculating the position of at least one child vertex comprises a step of determining the predetermined parent location.

57. A method as claimed in claim 56, wherein the step of determining the predetermined parent location comprises steps of:
  calculating a tessellation floor value corresponding to the largest integer value that is less than or equal to the respective edge tessellation rate (Fe); and
  determining the parent location as corresponding to that of a centre- section vertex when the edge tessellation rate (Fe) is equal to the calculated tessellation floor value.

58. A method as claimed in claim 55, wherein the step of calculating the position of at least one child vertex comprises a step of calculating the relative length of an edge segment extending between the pair of centre section child vertices.

59. A method as claimed in claim 58, wherein the step of calculating the length of the edge segment comprises steps of:
  assigning an ordinal value to the edge segment, the ordinal value corresponding to the fractional part of the edge tessellation rate (Fe) of the edge, divided by the number of pairs of edge section child vertices; and
  calculating a ratio between the assigned ordinal value and the calculated edge tessellation rate (Fe).

60. A method of tessellating a primitive of a base mesh having at least three base vertices the primitive being defined by edges extending between respective pairs of base vertices, the method comprising steps of:
  calculating a performance parameter;
  selecting a tessellation rate using the calculated performance parameter; and
  tessellating the primitive using the selected tessellation rate and, wherein the step of calculating a performance parameter comprises steps of:
  calculating a frame rendering time required to render a video image for display; and
  comparing the calculated frame rendering time to a predetermined required frame refresh rate.

61. A method of tessellating a primitive of a base mesh having at least three base vertices, the primitive being defined by edges extending between respective pairs of base vertices, the method comprising steps of:
  calculating a performance parameter;
  selecting a tessellation rate using the calculated performance parameter; and
  tessellating the primitive using the selected tessellation rate and wherein the step of calculating a performance parameter comprises steps of:
  counting a number of vertices within a frame to be rendered; and
  comparing the number of vertices to a predetermined maximum number of vertices.

* * * * *